United States Patent [19]

Norrid

[11] 4,440,812

[45] Apr. 3, 1984

[54] COLLAPSIBLE CENTERPIECE

[76] Inventor: Kay L. Norrid, 29772 Robert Dr., Livonia, Mich. 48150

[21] Appl. No.: 399,442

[22] Filed: Jul. 19, 1982

[51] Int. Cl.³ .............................................. A47B 3/06
[52] U.S. Cl. .................................... 428/12; 108/153; 108/159; 248/165; 428/542.2
[58] Field of Search .............................. 428/12, 542.2; 46/15–17; 108/97, 153, 159; 248/150–152, 165–174

[56]  References Cited

U.S. PATENT DOCUMENTS

| 2,000,915 | 5/1935 | Blake | 108/159 |
| 2,235,290 | 3/1941 | Exline et al. | 108/159 |
| 3,455,156 | 7/1969 | Kelly | 428/542.2 X |
| 3,501,072 | 3/1970 | Kovener | 248/174 X |
| 3,698,124 | 10/1972 | Reitzel et al. | 428/542.2 X |
| 3,705,556 | 12/1972 | Kelly | 428/12 X |
| 3,940,100 | 2/1976 | Haug | 428/542.2 X |

FOREIGN PATENT DOCUMENTS 533632 11/1956 Canada ................................ 108/153

Primary Examiner—Henry F. Epstein
Attorney, Agent, or Firm—Charles W. Chandler

[57] ABSTRACT

A collapsible centerpiece formed of sheet material comprising a first pair of legs having slots for receiving a second pair of legs so as to form a generally "X" shaped configuration, and a horizontal support having slots in its edges for receiving the upper edges of the legs to separate the legs and stabilize the assembled centerpiece.

4 Claims, 3 Drawing Figures

COLLAPSIBLE CENTERPIECE

BACKGROUND OF THE INVENTION

This invention is related to collapsible centerpieces, formed of sheet-like material and more particularly to a centerpiece having a plurality of legs supported along their lower edges in an upright position, and a horizontal support having slots for engaging the upper edges of the legs to form a stable assembly.

Decorative centerpieces formed of a light-weight sheet material are useful in a variety of applications such as weddings and the like, where a temporary centerpiece is used to support a flower arrangement or other items in an attractive setting. Usually such centerpieces require several components which must be assembled to form a stable support.

SUMMARY OF THE INVENTION

The broad purpose of the present invention is to provide a decorative centerpiece formed of a few components which can be easily assembled or collapsed. The preferred embodiment of the invention comprises a pair of horizontal legs disposed along their lower side edges on a supporting surface and engaged with a second pair of horizontal legs, each pair being formed of a stiff deformable sheet material, and a horizontal planar support mounted on the upper edges of the legs to separate them to form a stable base.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which.

DESCRIPTION OF THE PREFERRED EMBODIMENT

Figure 1:
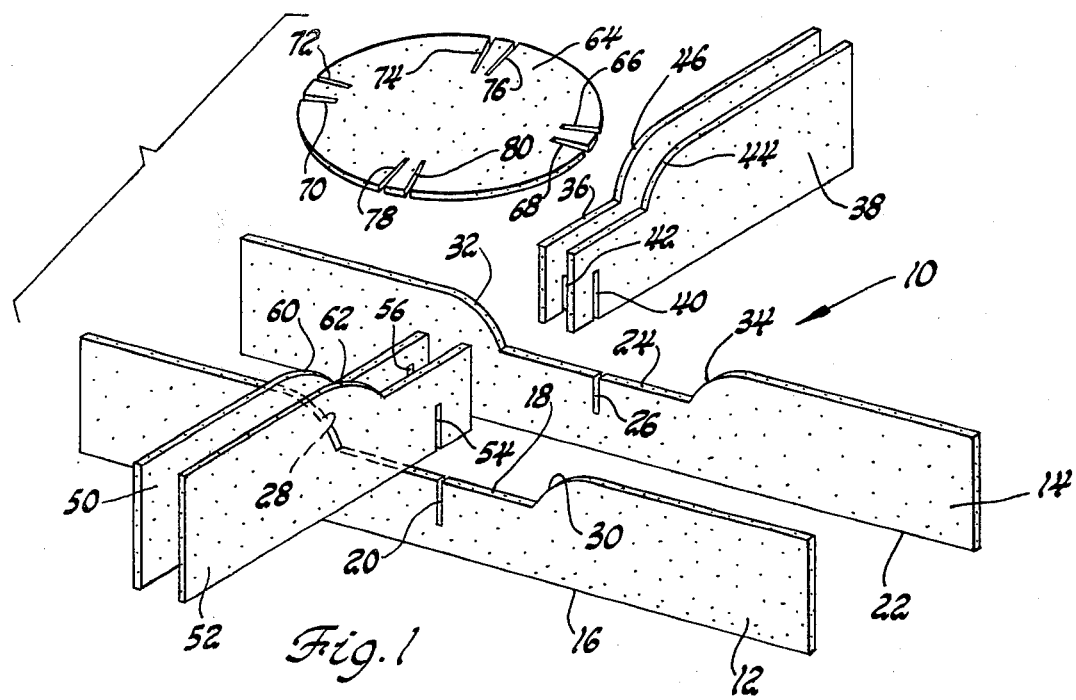
FIG. 1 is an exploded view of a collapsible centerpiece illustrating the preferred embodiment of the invention.

Referring to the drawing, FIG. 1 illustrates a preferred collapsible centerpiece 10 comprising a pair of legs 12 and 14. Legs 12 and 14 are formed of a stiff deformable sheet of material. Leg 12 has a lower edge 16, and upper edge 18 and a slot 20 in its mid-section.

Similarily, leg 14 has a lower edge 22, an upper edge 24 and a slot 26 in its mid-section.

The upper edge of leg 12 has spaced raised, rounded portions 28 and 30. The upper edge of leg 14 also has spaced raised rounded portions 32 and 34.

A second pair of legs 36 and 38 are also formed of a stiff deformable sheet material, and have slots 40 and 42 receivable in slots 20 and 26 of legs 12 and 14.

Preferably the height of the mid-sections of legs 36 and 38 corresponds to the height of the mid-section of legs 12 and 14. The upper edge of leg 38 has a raised rounded portion 44, while the upper edge of leg 36 has a raised rounded portion 46.

A third pair of legs 50 and 52 have lower edges, and slots 54 and 56 receivable in slots 20 and 26 of legs 12 and 14. The upper edges of legs 50 and 52 have raised rounded portions 60 and 62. The height of the mid-section of legs 50 and 52 corresponds to the height of the mid-section of legs 12 and 14.

Figure 2:
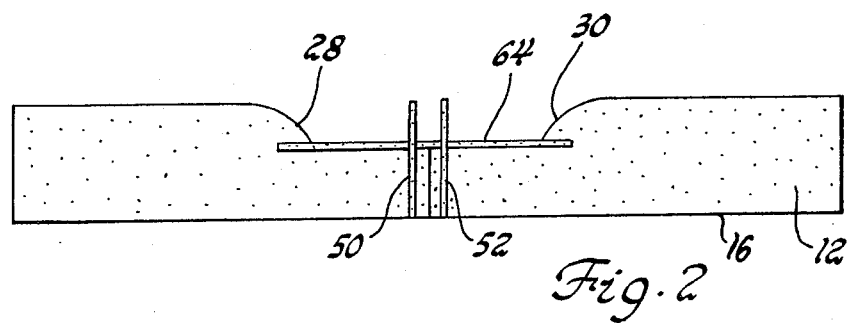
FIG. 2 is an elevational view of the preferred centerpiece.

A planar support 64, formed of a stiff deformable sheet material, is mounted on the assembled legs as best illustrated in FIG. 2. Support 64 has a diameter greater than the distance between the raised portions of the 6 legs, and slots 66 and 68 for receiving raised portions 34 and 30 of legs 12 and 14, slots 70 and 72 for receiving raised portions 28 and 32 of legs 12 and 14, slots 74 and 76 for receiving the raised portions 44 and 46, and slots 78 and 80 for receiving the raised portions 60 and 62 of legs 50 and 52. Each pair of slots in support 64 converge toward the center of the support as best shown in FIG. 3.

Figure 3:
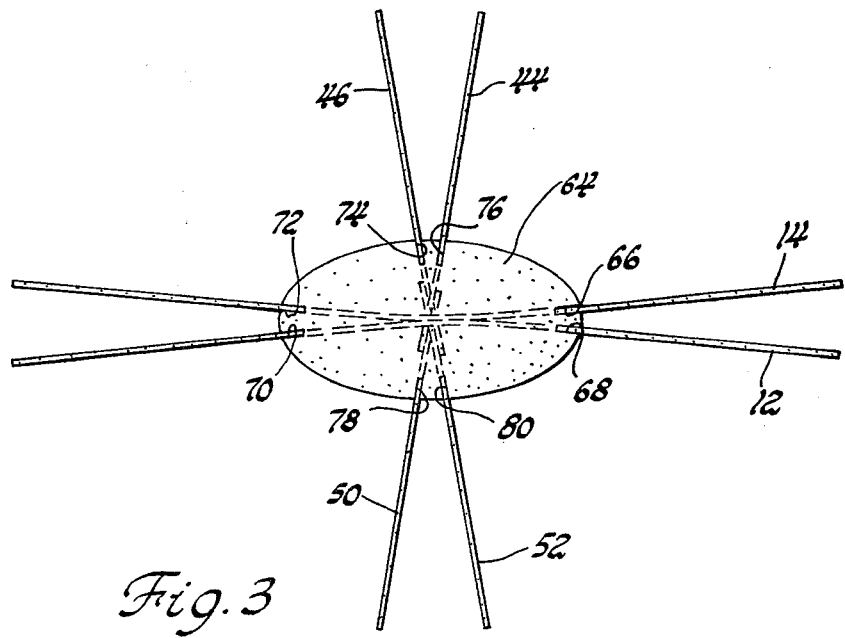
FIG. 3 is a plan view of the centerpiece.

As best illustrated in FIG. 3, support 64 is parallel to the bottom edges of the legs and is disposed such that the slots separate each pair of legs to form a stable assembly. In addition, each pair of legs is disposed at an angle of approximately 90° with respect to the adjacent pair of legs. The assembly can be easily and quickly assembled to form a stable centerpiece. It can also be quickly collapsed and stored in a relatively compact area.

Having described my invention, I claim:

1. A decorative, collapsible centerpiece, comprising:
    a first pair of elongated legs, each leg being formed of a stiff, deformable sheet material, each leg having a lower longitudinal side edge, and an upper longitudinal side edge;
    a second pair of elongated legs formed of a stiff deformable sheet material, each leg having a lower longitudinal side edge, and an upper longitudinal side edge;
    at least one of said pairs of legs having slot means in its mid-section for receiving the other of said pairs of legs, such that the lower longitudinal side edges of both of said pairs of legs are disposed in a common plane to cooperate to form a self-supporting assembly disposed along their lower longitudinal side edges; and
    a planar support formed of a stiff sheet material disposed on the upper longitudinal side edges of both of said pairs of legs, said planar support having slot means in its peripheral edge receiving a portion of each of said legs such that it is separated from the other of said legs.

2. A centerpiece as defined in claim 1, in which the first pair of legs is disposed at an angle of about 90 degrees with respect to the second pair of legs.

3. A collapsible centerpiece as defined in claim 1, in which the upper edge of each of said legs has a raised portion extending above said planar support at such times as both of said pairs of legs are disposed in a horizontal position, and the planar support engages each of said raised portions.

4. A decorative, collapsible centerpiece, comprising:
    a first pair of elongated legs, each leg being formed of a stiff sheet material, each leg having a lower longitudinal side edge, and an upper longitudinal side edge;
    a second pair of elongated legs formed of a stiff, sheet material, each leg having a lower longitudinal side edge and an upper longitudinal side edge;
    a third pair of elongated legs formed of a stiff sheet material, each leg having a lower longitudinal side edge and an upper longitudinal side edge;

the first pair of legs each having a slot in at least one of said longitudinal edges, adjacent the mid-section thereof;

the second pair of legs each having one end removably received in the slots of the first pair of legs;

the third pair of legs each having one end removably received in the slots of the first pair of legs adjacent the second pair of legs;

the third pair of legs having its major length on the opposite side of the first pair of legs as the major length of the second pair of legs in such a manner that the lower longitudinal side edges of the first, second and third pair of legs are disposed in a common plane for mounting on a supporting surface, and the upper longitudinal side edges of the first, second and third pairs of legs are disposed in an upper common plane; and a planar support formed of a stiff sheet material disposed on the upper longitudinal side edges of the first, second and third pairs of legs, the planar support having slot means in its peripheral edge removably receiving portions of the upper longitudinal side edges of each of said legs to separate the ends thereof opposite from the ends received in the slots of the first pair of legs, one from the other.

* * * * *